C. FRIEND.
MIRROR.
APPLICATION FILED JULY 19, 1918. RENEWED JUNE 28, 1920.

1,356,441.

Patented Oct. 19, 1920.

Witnesses
R. A. Thomas

Inventor
Clara Friend
By Victor J. Evans
Attorney

UNITED STATES PATENT OFFICE.

CLARA FRIEND, OF MEDICINE HAT, ALBERTA, CANADA.

MIRROR.

1,356,441. Specification of Letters Patent. Patented Oct. 19, 1920.

Application filed July 19, 1918, Serial No. 245,789. Renewed June 28, 1920. Serial No. 392,515.

*To all whom it may concern:*

Be it known that I, CLARA FRIEND, a subject of the King of Great Britain, residing at Medicine Hat, in the Province of Alberta and Dominion of Canada, have invented new and useful Improvements in Mirrors, of which the following is a specification.

This invention has reference to mirrors and particularly to mounts therefor.

The object of the invention is to provide means whereby a mirror may be suspended from a suitable frame to permit of the same being swung inwardly, outwardly or angularly with respect to the frame and effectively held in any of such positions.

Other objects and advantages of the improvement will appear as the nature of the invention is better understood, reference being had to the accompanying drawings, in which:—

Figure 1:
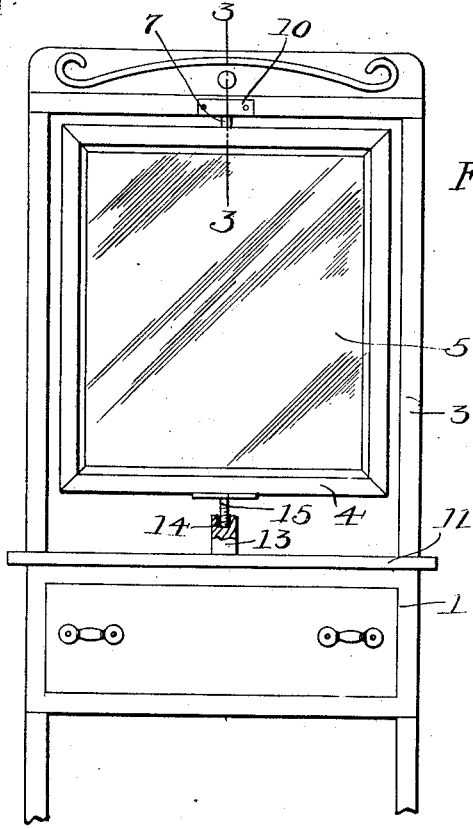
Figure 1 is a front elevation illustrating the improvement.
Figure 2:
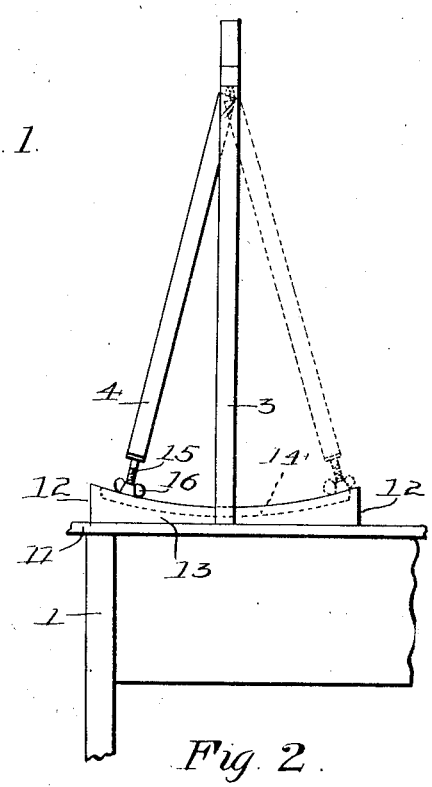
Fig. 2 is a side elevation of the same, both the full and dotted lines indicating the different angles at which the mirror may be swung with respect to the supporting frame therefor.
Figure 3:
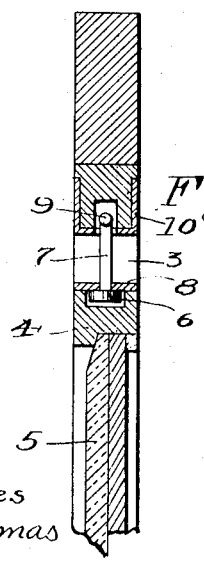
Fig. 3 is a greatly enlarged sectional view approximately on the line 3—3 of Fig. 1.

In the ordinary construction of dressing tables, bureaus and other articles of furniture, the mirror frame has its sides centrally pivoted to the said article of furniture. The pivots are in the nature of friction members and when the mirror is turned thereon one part thereof must necessarily swing to the rear of the article of furniture, and the other outward of such article. If the furniture is arranged close to a wall the same must be removed therefrom if the mirror is to be tilted to a determined angle, and in addition to this the friction elements associated with the pivots soon wear so that the said mirror can not, for any length of time be depended upon to remain at a desired angle. In addition to this the mirror can not be revolved or turned vertically with respect to the furniture to which it is attached and is in this and in other well known respects not entirely satisfactory to the user thereof.

In the drawings I have illustrated my improvement as applied to an ordinary dressing table which is indicated by the numeral 1 and which has arranged upon its top and rear portion the usual frame 3 that receives therein the mirror frame 4 provided with the usual mirror 5.

As disclosed by the drawings the mirror frame is disposed out of contact with the frame 3, and the said frame 4 is suspended from the frame 3 by a headed member 6 that is let in the upper edge of the mirror frame 4. The head 6 is preferably round, and the shank 7, which is integrally formed with the head 6 passes through an opening in a suitable plate 8 in the upper edge of the frame 4. The shank has its outer end provided with a lateral extension 9 that is received in a suitable keeper 10 that is secured to the upper bar of the frame 3 of the article of furniture. The keeper 10 has its lower portion provided with an elongated slot through which the shank 7 passes. The lateral extension or head 9 received in the keeper 10 is round in cross section and with the keeper provides a hinge for the mirror 5, whereby the mirror may be swung inwardly or outwardly with respect to the frame 3. The round head 6 also permits of the mirror being revolved on the shank 7 so that the mirror 5 may be arranged at a vertical angle with respect to the frame 3.

Figure 4:
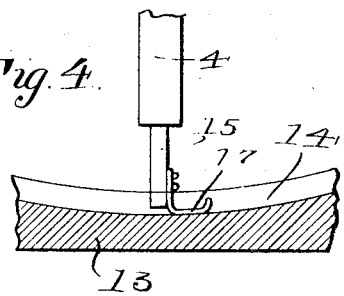
Fig. 4 is a detail, showing a modified form of binding means.

On the top 11 of the furniture 1, and centrally with respect to the frame 3 thereon I secure the opposite angle ends 12—12 of a concaved plate 13. This plate is in the nature of a radius bar and is centrally slotted as at 14. In the slot 14 is received a guide finger 15 that is secured to the lower bar of the mirror frame 4, and if desired, the said guide finger may be in the nature of a threaded element upon which is arranged a wing nut 16 that, when brought to contact with the plate 13 will hold the mirror frame at a proper angle with respect to the frame 3. It is obvious that in lieu of the wing nut 16 other binding means may be employed as for instance the finger 15 may have arranged thereon a spring plate 17 that contacts with the radius plate or bar 13, as illustrated in Fig. 4 of the drawings.

It is believed, from the foregoing description, when taken in connection with the accompanying drawings, the simplicity of construction and the method of operation will be readily apparent without further detailed description.

Having thus described the invention, what is claimed as new, is:—

In an article of furniture, a mirror hingedly and revolubly connected thereto, a concaved slotted guide member on said furniture for the mirror, a depending finger on the mirror received in the slot of the guide, and adjustable means on said finger designed to contact with the outer face of the guide for holding the mirror at determined inclinations with respect to the article of furniture.

In testimony whereof I affix my signature.

CLARA FRIEND.